US010931587B2

(12) United States Patent
Kulkarni et al.

(10) Patent No.: US 10,931,587 B2
(45) Date of Patent: Feb. 23, 2021

(54) SYSTEMS AND METHODS FOR CONGESTION CONTROL IN A NETWORK

(71) Applicant: RENIAC, INC., Mountain View, CA (US)

(72) Inventors: Chidamber Kulkarni, Hyderabad (IN); Prasanna Sundararajan, Palo Alto, CA (US)

(73) Assignee: RENIAC, INC., Mountain View, CA (US)

( * ) Notice: Subject to any disclaimer, the term of this patent is extended or adjusted under 35 U.S.C. 154(b) by 38 days.

(21) Appl. No.: 16/213,808

(22) Filed: Dec. 7, 2018

(65) Prior Publication Data

US 2019/0182170 A1 Jun. 13, 2019

Related U.S. Application Data

(60) Provisional application No. 62/596,385, filed on Dec. 8, 2017.

(51) Int. Cl.
*G06F 15/173* (2006.01)
*H04L 12/825* (2013.01)
(Continued)

(52) U.S. Cl.
CPC .............. *H04L 47/25* (2013.01); *H04L 47/11* (2013.01); *H04L 47/125* (2013.01);
(Continued)

(58) Field of Classification Search
CPC ....... H04L 47/25; H04L 47/11; H04L 47/125; H04L 47/193; H04L 47/27; H04L 69/163
(Continued)

(56) References Cited

U.S. PATENT DOCUMENTS 7,719,967 B2 * 5/2010 Thakur ................. H04L 69/163
370/229
7,760,642 B2 * 7/2010 Plamondon ............. H04L 47/10
370/235
(Continued)

OTHER PUBLICATIONS

Minakhmetov, Artur et al. "TCP Congestion Control in Datacenter Optical Packet Networks on Hybrid Switches," IEEE/OSA Journal on Communication Networks, vol. 10, No. 7, Jul. 13, 2018, pp. 71-81. (Year: 2018).*
(Continued)

*Primary Examiner* — Melvin H Pollack
(74) *Attorney, Agent, or Firm* — Artegis Law Group, LLP (57) ABSTRACT

A system includes a field-programmable gate array (FPGA) with a configurable logic module. The configurable logic module is configured to implement a protocol endpoint, the protocol endpoint including a congestion control module. In some examples, the protocol endpoint corresponds to a transport control protocol (TCP) endpoint. In some examples, state information associated with a networking protocol implemented by the protocol endpoint is stored in and retrieved from block memory of the configurable logic module. In some examples, no state information associated with the networking protocol is stored in and retrieved from a memory other than the block memory. In further examples, the congestion control module is configured to perform operations comprising monitoring a congestion condition of a network and dynamically switching among a plurality of congestion control algorithms based on the monitored congestion condition.

20 Claims, 7 Drawing Sheets

(51) Int. Cl.
*H04L 12/801* (2013.01)
*H04L 29/06* (2006.01)
*H04L 12/803* (2013.01)
*H04L 12/807* (2013.01)

(52) U.S. Cl.
CPC ............ *H04L 47/193* (2013.01); *H04L 47/27* (2013.01); *H04L 69/163* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 8,824,300 | B2 * | 9/2014 | Shatzkamer | H04L 47/26 370/326 |
| 8,831,041 | B2 * | 9/2014 | Keith | H04L 47/2433 370/477 |
| 9,160,663 | B2 * | 10/2015 | Westin | H04L 47/24 |
| 9,253,015 | B2 * | 2/2016 | Girard | H04L 29/0818 |
| 9,270,598 | B1 * | 2/2016 | Oran | H04L 67/327 |
| 9,286,221 | B1 | 3/2016 | Sundararajan et al. | |
| 9,344,374 | B2 * | 5/2016 | Stewart | H04L 47/33 |
| 9,350,672 | B2 * | 5/2016 | Patwardhan | H04L 47/193 |
| 9,419,908 | B2 * | 8/2016 | Kulkarni | H04L 47/122 |
| 9,450,867 | B2 * | 9/2016 | Oguchi | H04L 63/166 |
| 9,641,447 | B2 * | 5/2017 | Geijer Lundin | H04L 47/10 |
| 9,654,399 | B2 * | 5/2017 | Liu | H04L 47/31 |
| 9,674,318 | B2 * | 6/2017 | Pope | H04L 69/16 |
| 9,781,041 | B2 * | 10/2017 | Jain | H04L 47/125 |
| 9,860,185 | B2 * | 1/2018 | Morandin | H04L 47/27 |
| 9,929,956 | B2 * | 3/2018 | Ramaiah | H04L 47/12 |
| 9,929,961 | B2 * | 3/2018 | Luke | H04L 47/125 |
| 9,942,151 | B2 * | 4/2018 | Agarwal | H04L 47/12 |
| 9,985,889 | B2 * | 5/2018 | Agarwal | H04L 47/12 |
| 9,985,890 | B2 * | 5/2018 | Agarwal | H04L 47/12 |
| 9,985,898 | B2 * | 5/2018 | Ramaiah | H04L 47/27 |
| 10,045,252 | B2 * | 8/2018 | Agarwal | H04L 47/11 |
| 10,057,812 | B2 * | 8/2018 | Szilagyi | H04L 47/263 |
| 10,075,987 | B2 * | 9/2018 | Teyeb | H04L 69/14 |
| 10,142,262 | B2 * | 11/2018 | Lapidous | H04L 1/187 |
| 10,142,886 | B2 * | 11/2018 | Livanos | H04W 28/0289 |
| 10,158,575 | B2 * | 12/2018 | Dhanabalan | H04L 47/11 |
| 10,172,150 | B2 * | 1/2019 | Belghoul | H04L 45/306 |
| 10,257,097 | B1 * | 4/2019 | Kandasamy | H04L 47/193 |
| 10,263,894 | B2 * | 4/2019 | Lopez Serrano | H04L 47/14 |
| 10,292,066 | B2 * | 5/2019 | Sastry | H04W 28/02 |
| 10,348,600 | B2 * | 7/2019 | Perry | H04L 47/522 |
| 10,355,981 | B1 * | 7/2019 | Matthews | H04L 47/21 |
| 10,356,652 | B2 * | 7/2019 | Ma | H04W 74/0808 |
| 10,375,620 | B2 * | 8/2019 | Flynn | H04W 40/22 |
| 10,419,968 | B2 * | 9/2019 | Agrawal | H04L 47/12 |
| 10,425,338 | B2 * | 9/2019 | Agarwal | H04L 47/25 |
| 10,498,661 | B2 * | 12/2019 | Xie | H04L 45/00 |
| 10,498,867 | B2 * | 12/2019 | Pope | H04L 69/163 |
| 10,511,535 | B2 * | 12/2019 | Huang | H04L 47/122 |
| 10,530,695 | B2 * | 1/2020 | Cioffi | H04L 47/125 |
| 10,628,353 | B2 * | 4/2020 | Prabhakar | G06F 3/067 |
| 10,638,374 | B2 * | 4/2020 | Ye | H04W 36/38 |
| 10,644,978 | B2 * | 5/2020 | Dillon | H04L 47/196 |
| 10,652,930 | B2 * | 5/2020 | Ner | H04W 28/0231 |
| 10,700,772 | B2 * | 6/2020 | Xu | H04B 7/18523 |
| 10,712,738 | B2 * | 7/2020 | Cella | H04L 1/1874 |
| 2014/0164641 | A1 * | 6/2014 | Ye | H04L 47/127 709/235 |
| 2017/0149666 | A1 * | 5/2017 | Kiykioglu | H04L 47/27 |
| 2017/0295236 | A1 | 10/2017 | Kulkarni et al. | |
| 2017/0331744 | A1 * | 11/2017 | Mehrotra | H04L 47/283 |
| 2018/0095915 | A1 * | 4/2018 | Prabhakar | G06F 13/385 |
| 2018/0241679 | A1 * | 8/2018 | Muscariello | H04L 47/125 |
| 2019/0150027 | A1 * | 5/2019 | Ner | H04L 47/127 370/235 |
| 2019/0158371 | A1 * | 5/2019 | Dillon | H04L 43/087 |
| 2019/0268445 | A1 * | 8/2019 | Zhang | H04L 47/27 |
| 2019/0324444 | A1 * | 10/2019 | Cella | G05B 19/4184 |
| 2019/0349426 | A1 * | 11/2019 | Smith | H04W 4/08 |
| 2020/0177311 | A1 * | 6/2020 | Ho | H04L 1/0045 |
| 2020/0236043 | A1 * | 7/2020 | Sze | H04L 43/0882 |

OTHER PUBLICATIONS

Lu, Guohan et al. "ServerSwitch: A Programmable and High Performance Platform for Data Center Networks," Proceedings 8th USENIX Conference on Networked Systems Design and Implementation (NSDI), Mar. 2011, pp. 15-28. (Year: 2011).*

Sidler, David et al. "Low-Latency TCP/IP Stack for Data Center Applications," IEEE 26th International Conference on Field Programmable Logic and Applications (FPL), Sep. 29, 2016, pp. 1-4. (Year: 2016).*

Jamal, Habibullah and Sultan, Kiran. "Performance Analysis of TCP Congestion Control Algorithms," International Journal of Computers and Communications, Issue 1, vol. 2, 2008, P. 30. (Year: 2008).*

Allman, M. and Paxson, V. "TCP Congestion Control," RFC 5681, Sep. 2009. (Year: 2009).*

Jasem, Hayder et al. "The Delay with New-Additive Increase Multiplicative Decrease Congestion Avoidance and Control Algorithm," Information Technology Journal 9 (7), Asian Network for Scientific Information, 2010, p. 1327. (Year: 2010).*

Parthasarathy, V. et al. "Design, Simulation and FPGA Implementation of a Novel Router for Bulk Flow TCP in Optical IP Networks," IAENG Intl Journal of Computer Science, Nov. 12, 2011. (Year: 2011).*

Joshi, Nivedita et al. "Embedded Web Server on Nios II Embedded FPGA Platform," 2nd Intl Conference on Emerging Trends in Engineering and Technology (ICETET), 2009, p. 372. (Year: 2009).*

* cited by examiner

SYSTEMS AND METHODS FOR CONGESTION CONTROL IN A NETWORK

RELATED APPLICATION

The present application claims priority to and the benefit of U.S. Provisional Patent Application No. 62/596,385, filed Dec. 8, 2017 and entitled "System for Congestion Control in a Network," which is incorporated by reference herein.

TECHNICAL FIELD

The present disclosure relates generally to computing systems and the use of a networking protocol with congestion control and more specifically to systems and methods for congestion control in a network.

BACKGROUND

Networking protocols, such as the transmission control protocol (TCP), allow for communication to take place between two or more computing nodes in a network. For example, computing nodes that implement networking protocols may be located in data centers, mobile devices, personal computers, Internet of Things (IoT) enabled devices, and/or the like. The widespread proliferation of network-connected devices and applications over the last decade has resulted in an increasing demand for networking protocol implementations with improved performance (e.g., lower latency), size (e.g., reduced footprint), bandwidth, and energy efficiency.

Accordingly, improved implementations of networking protocols are desirable.

SUMMARY

Consistent with some embodiments, a system includes a field-programmable gate array (FPGA) with a configurable logic module. The configurable logic module is configured to implement a protocol endpoint, the protocol endpoint including a congestion control module. In some examples, the protocol endpoint corresponds to a transmission control protocol (TCP) endpoint. In some examples, state information associated with a networking protocol implemented by the protocol endpoint is stored in and retrieved from block memory of the configurable logic module. In some examples, no state information associated with the networking protocol is stored in and retrieved from a memory other than the block memory. In further examples, the congestion control module is configured to perform operations comprising monitoring a congestion condition of a network and dynamically switching among a plurality of congestion control algorithms based on the monitored congestion condition.

In some examples, the congestion control module is configured to initialize one or more variables and detect a network activity event. When the network activity event is reception of an acknowledgement (ACK), the congestion control module is configured to update one or more congestion metrics, dynamically select a congestion control algorithm based on the updated one or more congestion metrics, and apply the selected congestion metric. In some examples, to select the congestion control algorithm, the congestion control module is configured to apply one or more rules based on the updated one or more congestion metrics. In some examples, when the network activity event is a timeout, the congestion control module is configured to perform operations comprising applying timeout congestion control. In some examples, the timeout is associated with a retransmission time out or reception of three duplicate ACKs. In some examples, the selected congestion control algorithm is selected from a group consisting of TCP Tahoe, TCP Reno, TCP Vegas, TCP New Reno, TCP Hybla, TCP BIC, TCP CUBIC, Agile-SD TCP, TCP Westwood, TCP Westwood+, Compound TCP, TCP Proportional Rate Reduction, and TCP BBR.

According to some embodiments, a method of congestion control implemented on a field-programmable gate array (FPGA) includes receiving protocol data at a protocol endpoint configured in the FPGA, analyzing the protocol data to dynamically select a congestion control algorithm from a plurality of congestion control algorithms to apply to network traffic, and applying the congestion control algorithm using a congestion control module configured in the FPGA.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Communication networks are subject to congestive collapse, in which excessive congestion in a network prevents or limits the flow of information. To provide robust throughput and to avoid congestive collapse, a networking protocol, such as the transmission control protocol (TCP), may be adapted to implement one or more congestion control algorithms. The congestion control algorithms may include a variety of mechanisms to detect and mitigate congestion, such as a congestion window, a slow-start mechanism, an additive increase/multiplicative decrease (AIMD) algorithm, a fast retransmit mechanism, and/or the like.

One exemplary networking environment in which congestion control may be useful is a data center. Some data centers are configured to provide cloud services (e.g., software as a service (SaaS), platform as a service (PaaS), infrastructure as a service (IaaS), and/or the like), which enable users to develop, deploy, and/or use applications in highly scalable data center environments with little up-front investment in hardware infrastructure. Cloud services often provide a high degree of flexibility in selecting the software environment for running applications. For example, software applications may run on virtual machines that can be configured to implement a variety of highly customizable operating systems. Containerized applications provide even further user control over the software environment.

Users of cloud services may desire to improve the performance, efficiency, and/or security of their applications. In some cases, improvements may be implemented using specialized hardware that is tailored to the requirements of a particular application. However, the ability to fine tune the hardware configuration and/or use specialized hardware through a cloud service provider has historically been limited. For example, it may be difficult from a practical and/or business standpoint to implement a user-designed application specific integrated circuit (ASIC) through a cloud service. Users may have the option to upgrade their hardware resources (e.g., by paying to run their software on faster processors, and/or systems with more memory), but there is typically little ability to modify or customize the hardware itself. Often, this is intentional. For example, virtual machine and container environments purposefully decouple software applications from the underlying hardware infrastructure of the data center.

Increasingly, however, cloud services are providing services that enable flexibility and control not only over the software environment, but also the underlying hardware architecture. This allows users to deploy applications with more granular control over performance, efficiency, and security. One way cloud services provide control of the hardware configuration is by installing and providing access to field programmable gate arrays (FPGAs) in their data centers. In an FPGA, the underlying circuitry is user-configurable, and may be configured remotely, e.g., by uploading a hardware description language (HDL) file that describes the desired hardware configuration.

Accordingly, it would be desirable to develop improved hardware-accelerated implementations of a networking protocol with congestion control. The hardware-accelerated implementations may be used, for example, in a cloud computing environment.

Figure 1:
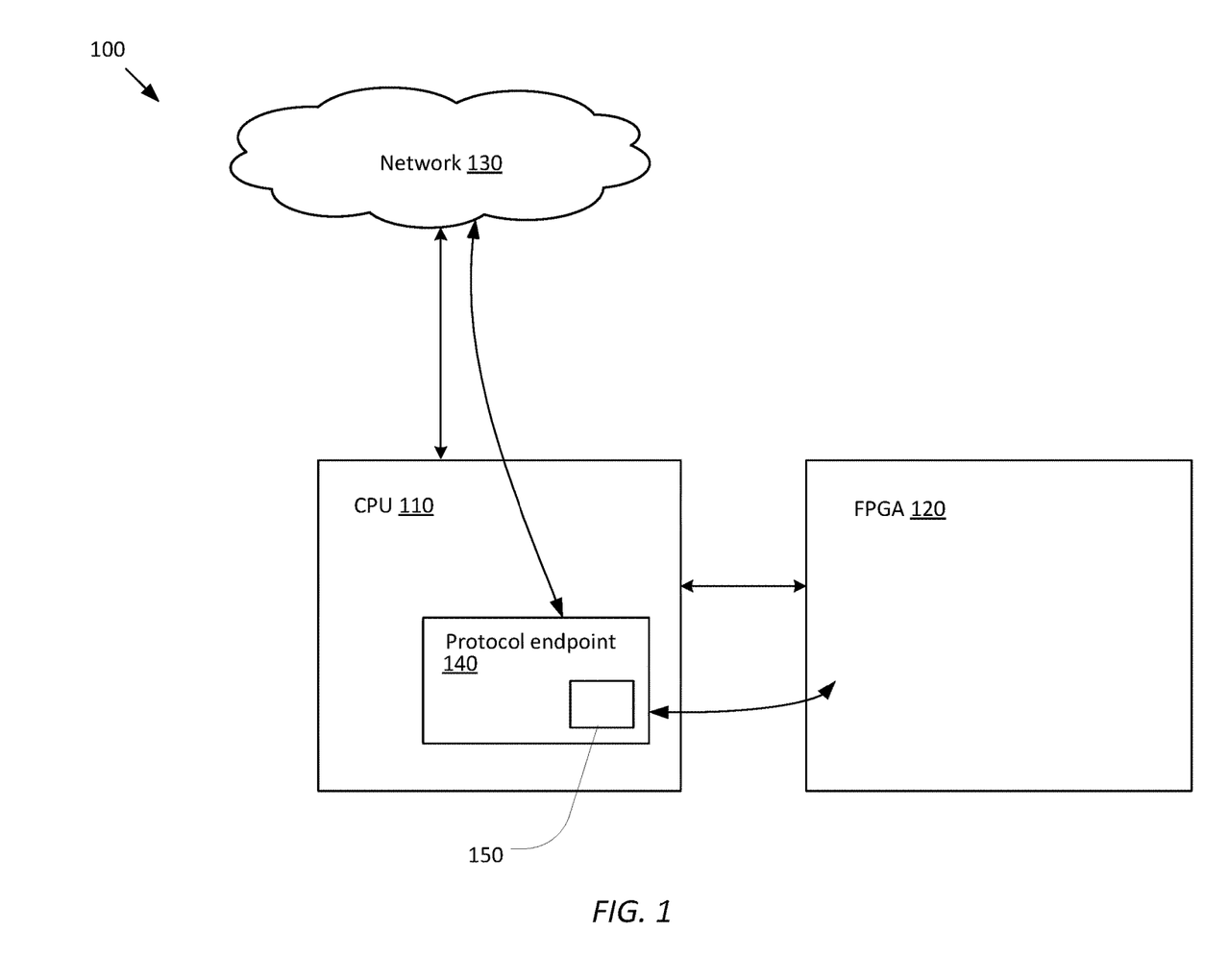
FIG. 1 is a simplified diagram of a system for implementing a network protocol with congestion control.

FIG. 1 is a simplified diagram of a system 100 for implementing a network protocol with congestion control. In some examples, system 100 may be used in various networking contexts, including a data center, mobile device, personal computer, Internet of Things (IoT) enabled device, and/or the like.

System 100 includes a central processing unit (CPU) 110 and a field programmable gate array (FPGA) 120 configured to communicate with remote nodes via a network 130. Although only one CPU 110 and FPGA 120 are shown, system 100 may include multiple CPUs, FPGAs, processors, multi-core processors, application specific integrated circuits (ASICs), and/or the like. CPU 110 and/or FPGA 120 may be configured to read and/or execute instructions from a memory, which may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. CPU 110 and/or FPGA 120 may be implemented using multiple chips in multiple packages, multiple chips in a single package (e.g., system-in-package (SIP)), and/or a single chip (e.g., system-on-chip (SOC)).

In some examples, system 100 may implement a networking protocol (e.g., TCP). In furtherance of such examples, CPU 110 may include a protocol endpoint 140 for receiving protocol data 142 via network 130 (e.g., a TCP segment and/or an IP datagram) and converting protocol data 142 into application data 144. Application data 144 may then undergo further processing by CPU 110 and/or FPGA 120. Protocol endpoint 140 may also operate in reverse, i.e., converting application data 144 into protocol data 142 and transmitting protocol data 142 via network 130.

In some examples, the networking protocol implemented by system 100 may include congestion control (e.g., TCP congestion control). In furtherance of such examples, protocol endpoint 140 may include a congestion control module 150. For example, congestion control module 150 may monitor the congestion condition of network 130 and implement one or more of a plurality of congestion control algorithms based on the monitored congestion condition. Examples of congestion control algorithms include TCP Tahoe, TCP Reno, TCP Vegas, TCP New Reno, TCP Hybla, TCP BIC, TCP CUBIC, Agile-SD TCP, TCP Westwood, TCP Westwood+, Compound TCP, TCP Proportional Rate Reduction, TCP BBR, and/or the like.

As depicted in FIG. 1, protocol endpoint 140 and congestion control module 150 are implemented on CPU 110. In some examples, protocol endpoint 140 and congestion control module 150 may be part of an operating system running on CPU 110. For example, protocol endpoint 140 and congestion control module 150 may correspond to an implementation of TCP for the Linux operating system.

One disadvantage of the architecture of system 100 is the relatively high latency associated with implementing protocol endpoint 140 and congestion control module 150 in software and/or firmware on CPU 110. Such latency may cause an input/output (I/O) bottleneck in system 100, particularly when system 100 is used to run high throughput, data-intensive applications, e.g., a database application.

In general, performance may be accelerated if the functions of protocol endpoint 140 and congestion control module 150 are implemented in hardware on FPGA 120. Accordingly, it may be desirable to improve the performance of system 100 by implementing protocol endpoint 140 and congestion control module 150 using FPGA 120.

Figure 2:
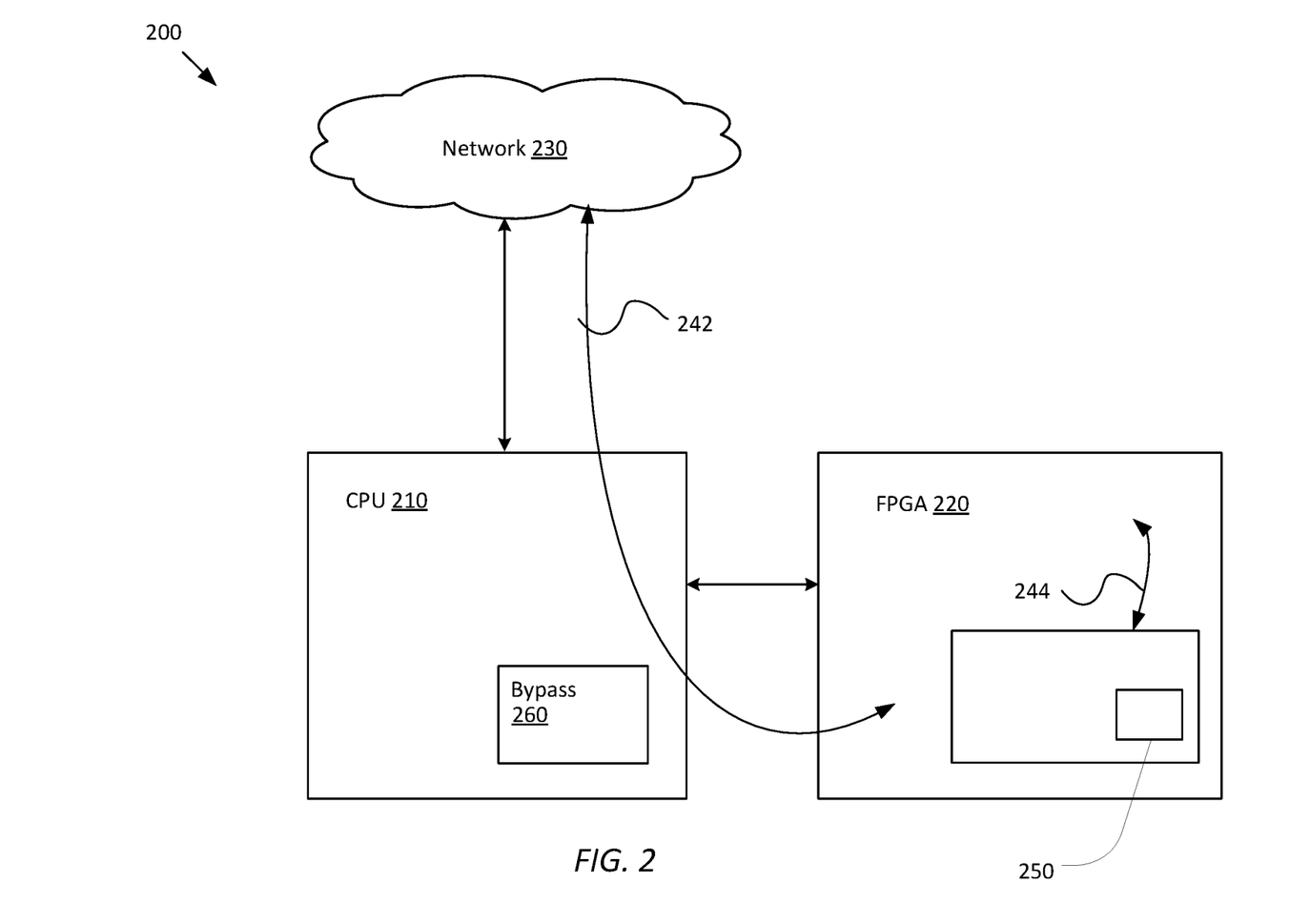
FIG. 2 is a simplified diagram of a system for implementing a network protocol with congestion control on an FPGA according to some embodiments.

FIG. 2 is a simplified diagram of a system 200 for implementing a network protocol with congestion control on an FPGA according to some embodiments. According to some embodiments, system 200 may include a CPU 210, an FPGA 220, and a network 230, which generally correspond to similarly labeled features of FIG. 1.

System 200 further includes a protocol endpoint 240 and a congestion control module 250, which may generally correspond to protocol endpoint 140 and congestion control module 150, respectively. In this regard, protocol endpoint 240 may receive protocol data 242 (e.g., a TCP segment and/or an IP datagram) and convert protocol data 242 into application data 244. However, unlike protocol endpoint 140, protocol endpoint 240 is implemented in hardware using FPGA 220, rather than in software and/or firmware using CPU 210. Moreover, congestion control module 250 is also implemented in hardware using FPGA 220, rather than in software and/or firmware using CPU 210. Accordingly, system 200 may provide hardware-accelerated 110 performance relative to system 100.

In some embodiments, system 100 may include a bypass module 260, implemented on CPU 210, to forward protocol data 242 to FPGA 220 without first converting protocol data 242 to application data 244 by CPU 210. For example, bypass module 260 may cause protocol data 242 to bypass one or more protocol endpoints that may be running on an operating system of CPU 210 and that would otherwise process protocol data 242. In some embodiments, bypass module 260 may filter protocol data 242 to determine the destination of protocol data 242. For example, the destination may include CPU 210, FPGA 220, and/or another component of system 200. Bypass module 260 may then route protocol data 242 to an appropriate protocol endpoint associated with the destination.

As discussed above and further emphasized here, FIG. 2 is merely an example which should not unduly limit the scope of the claims. One of ordinary skill in the art would recognize many variations, alternatives, and modifications. According to some embodiments, bypass module 260 may be located in FPGA 220 with the protocol data 242 being received directly from network 230 for handling by protocol endpoint 240 without first having to be passed through CPU 210. This allows protocol endpoint 240 and congestion control module 250 to address the protocol data 242 and congestion directly with protocol endpoint 240 and bypass module 260 forwarding the protocol data 242 as appropriate to CPU 210 for processing in due course.

Figure 3:
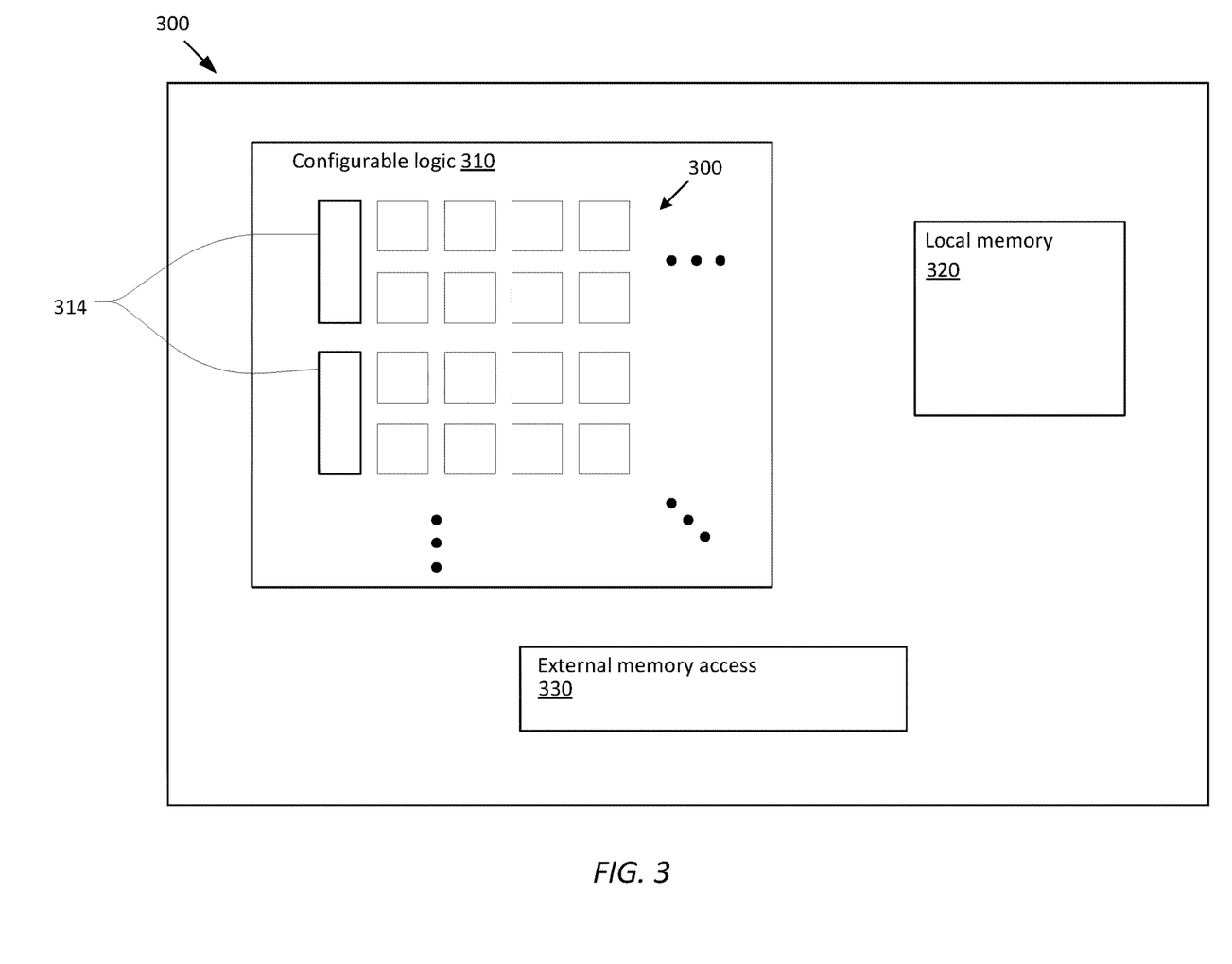
FIG. 3 is a simplified diagram of an FPGA configured to implement a network protocol with congestion control according to some embodiments.

FIG. 3 is a simplified diagram of an FPGA 300 configured to implement a network protocol with congestion control according to some embodiments. According to some embodiments consistent with FIG. 2, FPGA 300 may be used to implement FPGA 220 of system 200. It is to be understood that FIG. 3 is merely an illustration, and that the FPGA architecture may vary significantly by product line, vendor, technology node, and/or the like.

In some embodiments, FPGA 300 may include a configurable logic module 310. In general, the circuits and/or interconnections of configurable logic module 310 are user-configurable and may be adapted to perform hardware-accelerated operations. For example, the configuration of configurable logic module 310 may be specified using a hardware description language, such as VHDL and/or Verilog. In some examples, configurable logic module 310 may include one or more configurable logic blocks 312 and one or more block memory modules 314. For example, block memory modules 314 may be implemented using block random access memory (BRAM). As depicted in FIG. 3, configurable logic module 310 includes an array of configurable logic blocks 312 and block memory modules 314.

In some examples, FPGA 300 may include various additional modules, such as a local memory 320 and/or an external memory access module 330. In some examples, local memory 320 may be implemented using static random access memory (SRAM). In some examples, external memory access module 330 may provide an interface to one or more external memories, such as dynamic random access memory (DRAM), hard disk drive (HDD), solid state drive (SSD), and/or the like. Other modules of FPGA 300 (not shown) may include I/O interfaces, communication buses, processor cores, and/or the like.

In some embodiments, configurable logic module 310 may be configured to implement a networking protocol (e.g., TCP) with congestion control. In this regard, configurable logic module 310 (and/or a portion thereof) may correspond to a protocol endpoint, such as protocol endpoint 240, and/or a congestion control module, such as congestion control module 250. In some examples, the entirety of the networking protocol, including the congestion control, may be performed within configurable logic module 310. For example, state information associated with the networking protocol may be stored in block memory modules 314, and operations based on the state information may be performed using configurable logic blocks 312. Examples of state information include data and/or metadata pertaining to a particular network connection.

Due to the proximity and performance of block memory modules 314, state information may generally be retrieved very quickly from block memory modules 314 by configurable logic blocks 312. For example, retrieval of state information may reliably occur in ten clock cycles or less. By contrast, information stored in local memory 320 and/or external memory accessed via external memory access module 330 may take significantly greater than ten clock cycles to retrieve and/or may be retrieved in a non-deterministic time frame. Accordingly, implementing the networking protocol with congestion control exclusively, or substantially exclusively, using block memory modules 314 and configurable logic blocks 312 (e.g., without accessing information from local memory 320 and/or external memory) may result in significant performance gains.

Figure 4:
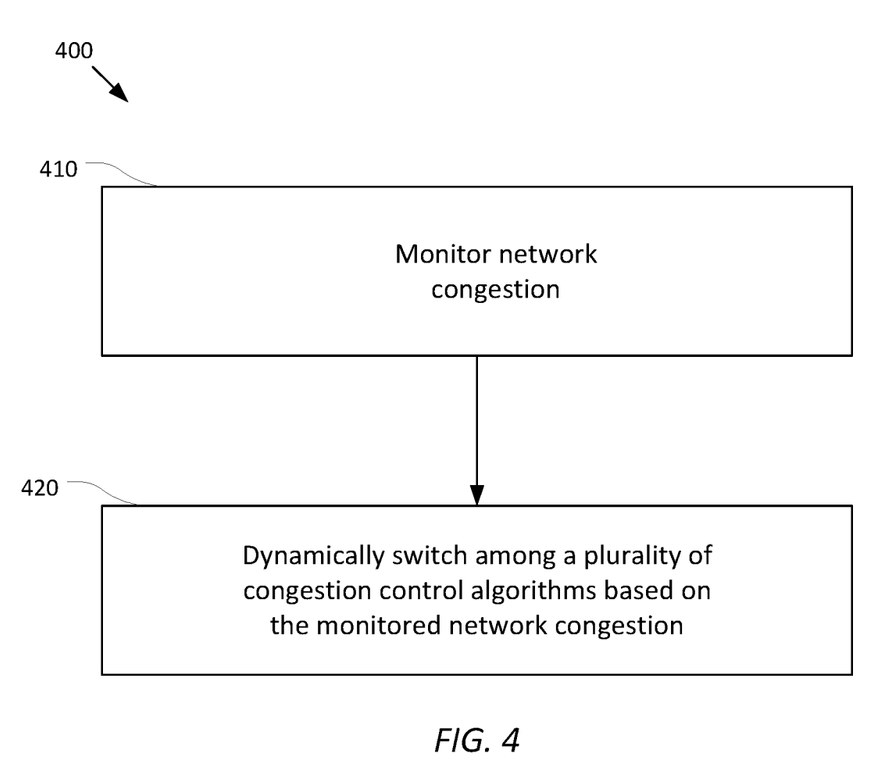
FIG. 4 is a simplified diagram of a method for dynamically switching among a plurality of congestion control algorithms according to some embodiments.

FIG. 4 is a simplified diagram of a method 400 for dynamically switching among a plurality of congestion control algorithms according to some embodiments. According to some embodiments consistent with FIGS. 2 and/or 3, method 400 may be performed by an FPGA, such as FPGA 220 and/or 300. In particular, method 400 may be performed using an FPGA configured to implement a hardware-accelerated protocol endpoint with congestion control, such as protocol endpoint 240. In some examples, method 400 may be implemented as a hardware-defined state machine using configurable logic blocks and/or block memory of the FPGA.

As discussed previously, a particular networking protocol may include a plurality of congestion control algorithms, each of which may be suited for particular congestion conditions. For example, TCP congestion control includes a multi-faceted set of congestion control algorithms including TCP Tahoe, TCP Reno, TCP Vegas, TCP New Reno, TCP Hybla, TCP BIC, TCP CUBIC, Agile-SD TCP, TCP Westwood, TCP Westwood+, Compound TCP, TCP Proportional Rate Reduction, TCP BBR, and/or the like. Accordingly, the ability to determine congestion conditions in real-time and switch among the plurality of congestion control algorithms may improve the ability of the networking endpoint to avoid congestive collapse and/or other congestion-associated inefficiencies.

At a process 410, a congestion condition of a network, such as network 230, is monitored. In some examples, network congestion may be indicated by a loss of data (e.g., dropped packets), a delay in data transmission (e.g., delayed delivery of packets), and/or the like. Accordingly, monitoring the congestion condition of the network may include detecting a loss of data and/or a delay of incoming packets. Additionally or alternately, monitoring the congestion condition of the network may include monitoring one or more network parameters, including one or more of the following: a bandwidth-delay of the network (e.g., to detect networks with bursty, long delay, and/or other traffic patterns associated with congestion); lossy links (e.g., to detect a link that routinely loses data according to a known or unknown pattern); fairness of the network scheduling (e.g., to detect whether the network scheduling favors particular connections over others); variability of network speed; a rate of convergence for the current congestion control algorithm (e.g., to detect whether recovery from packet loss and/or delay occurs within an acceptable threshold time); and/or the like.

At a process 420, switching among a plurality of congestion control algorithms based on the monitored congestion condition is performed. In some examples, a default congestion control algorithm may be performed initially and/or at other times when the network is uncongested. For example, in the context of TCP, the default congestion control algorithm may correspond to a slow start algorithm, such as TCP Tahoe. In response to detecting a change in the congestion conditions at process 410 (e.g., detecting a loss of data), a second congestion control algorithm among the plurality of congestion control algorithms may be selected and performed. In some examples, the second congestion control algorithm may be selected based on one or more parameters (e.g., user-defined parameters) that indicate which of the plurality of congestion control algorithms should be used given the monitored congestion conditions. For example, in the context of TCP, the congestion control algorithm used during a high congestion period may correspond to a fast re-transmit algorithm, such as TCP Reno. In some embodiments, switching among the plurality of congestion control algorithms may proceed dynamically. For example, new congestion conditions may arise for which a different congestion control algorithm is better suited than the current congestion control algorithm, and/or the current congestion control algorithm may be less effective than anticipated. In this regard, method 400 may improve the performance of the protocol endpoint by dynamically adapting to current network conditions.

According to some embodiments, congestion control in a communication network is a measure to avoid break down of communication over a network connection due to a backlog of packets that are not getting delivered to their respective destinations. In many congestion/data loss control strategies, there is inefficiency in the handling of congestion because the congestion control strategies are not able to accurately identify the root cause of the congestion. In general, there are typically three causes that may result in data loss in a communication network. These causes include network congestion, channel-related errors, and link failures.

Even though a communication network, such as a communication network using TCP, is able to detect the loss of data and take steps to correct for that loss, it generally does so by assuming that the data loss is caused by network congestion. When this isn't the case, the communication network may not be taking the most appropriate steps to address the root cause of the data loss and, thus, does not generally react appropriately to best mitigates the effects of that loss.

According to some embodiments, a data loss and/or congestion control strategy that is better able to classify the root cause of data loss is better able to mitigate that data loss. In some examples, the classification of the root cause of the data loss typically involves the computation and update of one or more congestion metrics and analyzing the one or more congestion metrics. In some examples, the computation and analysis of the one or more congestion metrics may be computationally expensive, thus there are advantages to handling this in hardware, such as by using the FPGA-based congestion control module 250.

According to some embodiments, the one or more congestion metrics may include a congestion window (CWND) metric, which provides an estimation of how much data is in transit within a network as indicated by data that has been transmitted but has not yet been acknowledged. In some examples, a TCP-based congestion control module may keep track of CWND by tracking the SEQ and ACK numbers on the sender side of the communication. For example, congestion control algorithms such as TCP Tahoe or Reno work based on just the CWND calculation and are among the most commonly deployed congestion control algorithms because they are simple and typically work well for most data loss caused by network congestion.

According to some embodiments, a more pro-active approach to data loss and congestion is to attempt to forecast whether congestion is likely to occur in the near future. In some examples, a metric $\beta$, computed according to EQN. 1, may be used to help forecast likely future congestion, where RTT is the round-trip time between transmission of a network packet and receipt of a corresponding ACK. For example, the TCP Vegas congestion control algorithm makes a determination of whether $\beta$ is positive and decreases CWND (i.e., the number of transmitted, but not acknowledged, packets that a sender may transmit) by a set amount, such as 2. Thus, TCP Vegas attempts to control congestion based on the forecast metric $\beta$ by reducing the ability of the sender to contribute to the congestion.

Actual sending rate=$CWND_{last}/RTT_{last}$

Estimated sending rate=$CWND_{current}/RTT_{min}$ $\beta$=Actual sending rate−Estimated sending rate      EQN. 1

According to some embodiments, the one or more congestion metrics may include metrics that more accurately characterize congestion and data loss. In some examples, the one or more congestion metrics may include an estimated bandwidth metric (BWE) that may be computed according to EQN. 2. For example, the TCP Westwood congestion control algorithm uses the BWE metric and applies a mix of the TCP New Reno congestion control algorithm approach to the detection of packet loss using a re-transmission time out (RTO) mechanism that involves waiting until either RTO occurs or three duplicate ACKs are received to determine when a packet is lost.

BWE=Ack_Size/Ack_Interval

Ack_Size=total size of the ACK windows $Ack_{interval}$=difference between last received ACK and current BWE      EQN. 2

According to some embodiments, using a various mix of these one or more congestion metrics and a hybrid approach that balances both the BWE metric and the current TCP segment size (SegSize) may be used to indicate when use of TCP Westwood is preferable over other congestion control algorithms.

Figure 5:
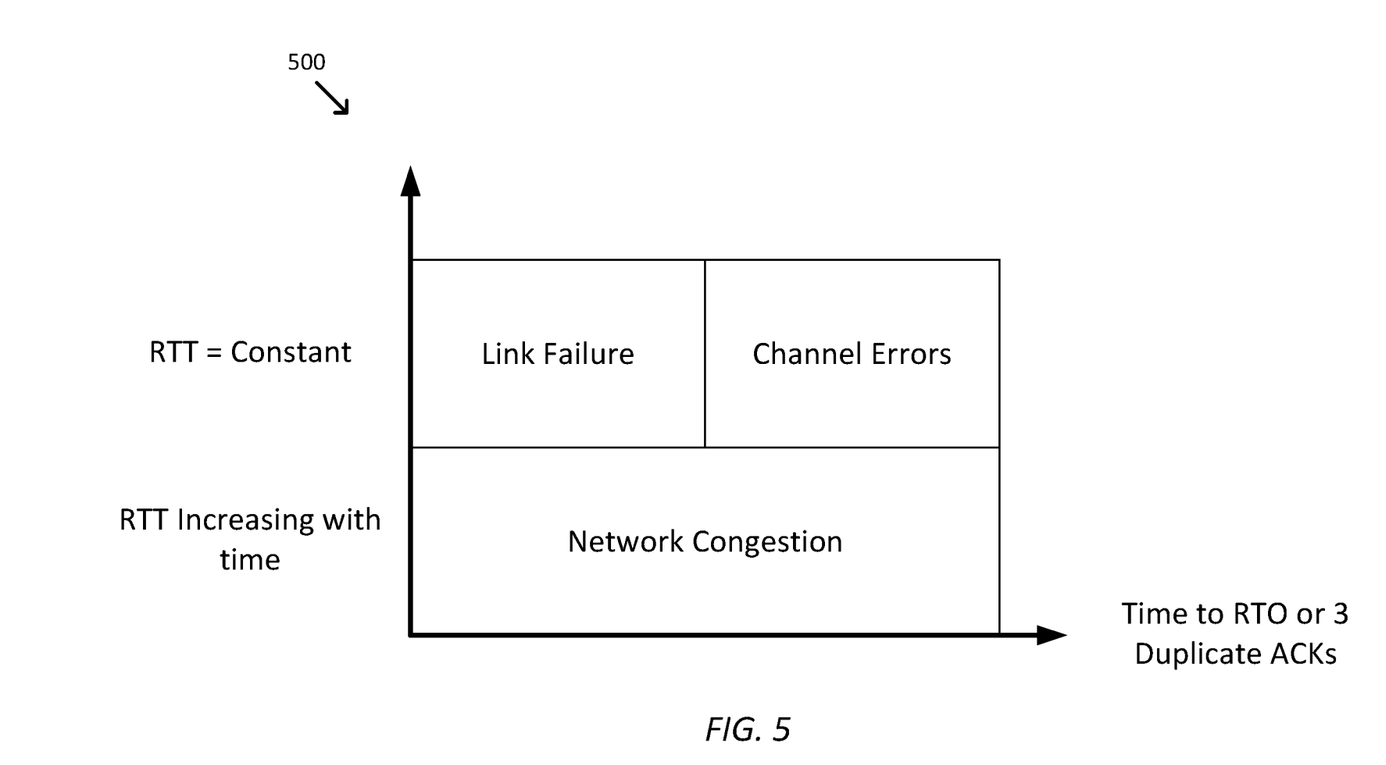
FIG. 5 is a simplified diagram of relationships between network monitoring metrics and network congestion causes according to some embodiments.

FIG. 5 is a simplified diagram of relationships 500 between network monitoring metrics and network congestion causes according to some embodiments. As shown in FIG. 5, the root cause of data loss may be determined by examining the relationship between the round-trip time (RTT) of packets and the amount of time elapsed before RTO or the receiving of three duplicate ACKs. More specifically, link failure is identified as the root cause when RTT is constant and the time to RTO or the receiving of three duplicate ACKs is below a threshold, channel errors are identified when RTT is constant and the time to RTO or the receiving of three duplicate ACKs is above a threshold, and network congestion is identified when RTT is increasing over time.

Figure 6:
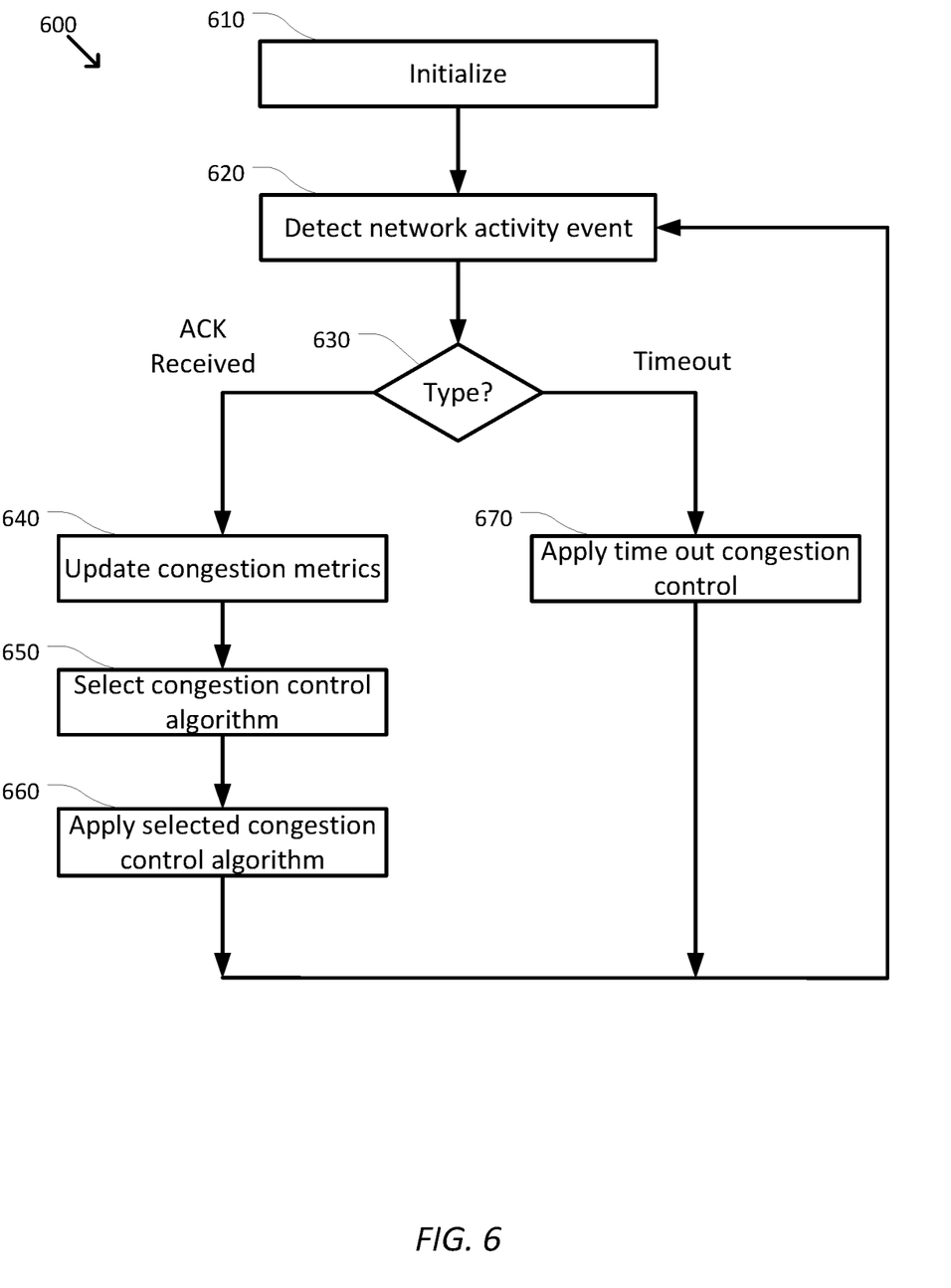
FIG. 6 is a simplified diagram of another method for dynamically switching among a plurality of congestion control algorithms according to some embodiments.

FIG. 6 is a simplified diagram of another method 600 for dynamically switching among a plurality of congestion control algorithms according to some embodiments. According to some embodiments consistent with FIGS. 2, 3, and/or 4, method 600 may be performed by an FPGA, such as FPGA 220 and/or 300. In particular, method 600 may be performed using an FPGA configured to implement a hardware-accelerated protocol endpoint with congestion control, such as protocol endpoint 240. In some examples, method 600 may be implemented as a hardware-defined state machine using configurable logic blocks and/or block memory of the FPGA.

At a process 610, initialization of a congestion control module, such as congestion control module 250 occurs. In some examples, the initialization may include setting default and/or initial values used to control the various congestion control algorithms. In some examples, the variables and initial values may include one or more of setting CWND to 1, setting an SST Threshold to infinite, setting $RTT_{min}$ to 1, setting $RTT_{last}$ to 1, setting β to 1, setting BWE to an initial estimate, setting the number of ACKs to 0, and/or the like. In some examples, the initialization may include starting without using a congestion control algorithm or starting with a default congestion control algorithm, such as TCP Reno.

At a process 620, a network activity event is detected. In some examples, the network activity event may be detected in response to receiving a packet, such as an ACK packet. In some examples, the network activity event may be detected in response to a timer (e.g., a timer associated with RTO) timing out.

At a process 630, a type of the detected network activity event is determined. When the type of the network activity event is the receiving of an ACK, the ACK and a congestion response are processed beginning with a process 640. When the type of the network activity event is a timeout, the timeout and a congestion response are processed beginning with a process 670.

At the process 640, one or more congestion metrics are updated. In some examples, the one or more congestion metrics may include one or more of determining an updated value for β (e.g., by using EQN. 1), determining an updated value for BWE (e.g., by using EQN. 2), determining an updated value for any of the variables references in EQNs. 1 and/or 2, and/or the like.

At the process 650, a congestion control algorithm is selected based on the congestion metrics updated during process 640, the variables of process 610, and/or the like. In some examples, the congestion control algorithm may be selected using a set of rules. In some examples, the rules may be consistent with the rules shown in Table 1, where the indicated congestion control algorithm is selected when the indicated condition is satisfied. In some examples, the rules may be prioritized so that the rules are applied in a predetermined order until a first matching rule is identified. In some examples, the predetermined order may be the order of the rules as shown in Table 1.

TABLE 1

| Rule | Condition | Congestion Control Algorithm | Mitigation Action |
|---|---|---|---|
| 1 | CWND < SST Threshold | TCP Reno | CWND = CWND + 1 |
| 2 | β > 1 | TCP Vegas | CWND = 0.75 * CWND |
| 3 | $\frac{BWE * RTT_{min}}{SegSize} > 2$ | TCP Westwood | CWND = 1 |
| 4 | Otherwise | Default | CWND = CWND + 1/CWND |

At the process 660, the congestion control algorithm selected during process 650 is applied. In some examples, the congestion control algorithm may be applied by changing a value for CWND, which controls how many packets may be transmitted that have not been acknowledged and thus prohibits the transmission of additional packets beyond the CWND limit until an ACK is received that acknowledges safe receipt of a packet in the CWND window. In some examples, CWND may be changed according to the corresponding mitigation action in Table 1. Once the congestion control algorithm is applied, method 600 returns to process 620 to await detection of a next network activity event.

At the process 670, time out congestion control is applied. In some examples, the time out congestion control may include setting the SST Threshold to 0.5*CWND and setting CWND to 1. Once the time out congestion control is applied, method 600 returns to process 620 to await detection of a next network activity event.

As discussed above and further emphasized here, FIG. 6 is merely an example which should not unduly limit the scope of the claims. One of ordinary skill in the art would recognize many variations, alternatives, and modifications. According to some embodiments, method 600 may be enhanced and/or adapted to switch between congestion control algorithms other than TCP Reno, TCP Vegas, and TCP Westwood as discussed above. In some examples, the other congestion control algorithms may include one or more of TCP Tahoe, TCP New Reno, TCP Hybla, TCP BIC, TCP CUBIC, Agile-SD TCP, TCP Westwood+, Compound TCP, TCP Proportional Rate Reduction, TCP BBR, and/or the like.

Figure 7:
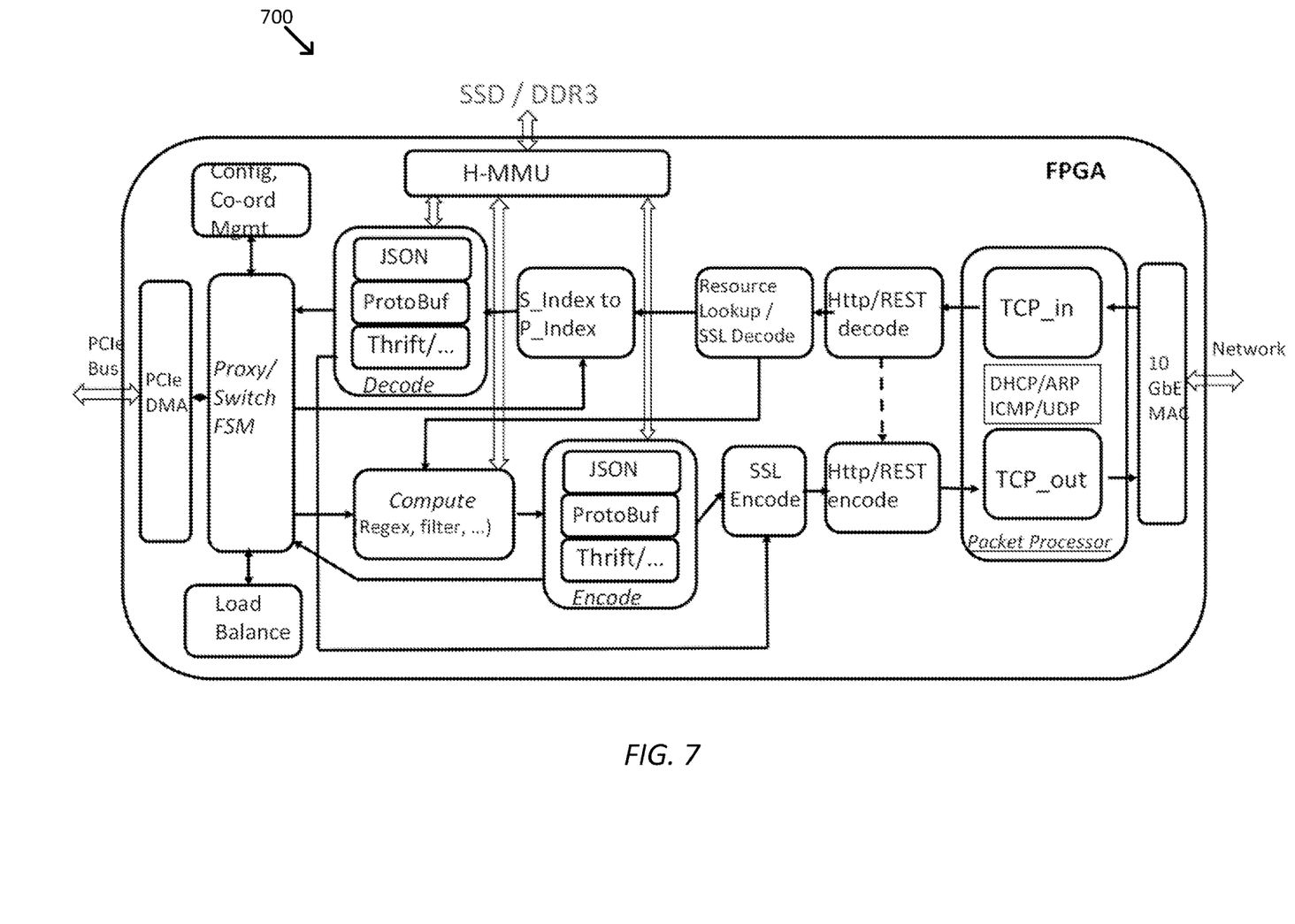
FIG. 7 is a simplified diagram of an internal architecture for a NoSQL Proxy according to some embodiments.

FIG. 7 is a simplified diagram of an internal architecture for a NoSQL Proxy 700 according to some embodiments. In some embodiments consistent with FIGS. 2-4, NoSQL Proxy 700 may be implemented on one or more FPGAs, such as FPGA 220 and/or 300. In some embodiments, NoSQL Proxy 700 may include a protocol endpoint, such as protocol endpoint 240.

In some examples, NoSQL Proxy 700 may be in example of a data-intensive application in which the latency of the protocol endpoint may create a performance bottleneck. Consequently, the improved hardware-accelerated implementations of a networking protocol with congestion control of the present disclosure may significantly improve the performance of NoSQL Proxy 700. A detailed description of a NoSQL proxy is included in U.S. patent application Ser. No. 15/344,993, entitled "System and Method for a Database Proxy," which is hereinafter incorporated by reference in its entirety.

As shown in FIG. 5, NoSQL Proxy 700 includes the following subsystems:

1. the IO sub-system includes a 10 GbE MAC, a hybrid memory controller interfacing with DDR3 DRAM memory and SSD Flash memory, and a PCIe 3.0 interface. In some examples, this sub-system is implemented in Verilog. Depending upon whether NoSQL Proxy 700 is located in the application server of the NoSQL data store, data commands to be processed by NoSQL Proxy 700 may be received via the PCIe interface and/or the network via the 10 GbE MAC.
2. the packet processor manages Ethernet and TCP/IP connection. The packet processor supports IPv4, TCP, DHCP, ARP, ICMP protocols. In some embodiments, the packet processor may implement one or more protocol endpoints, such as a TCP endpoint, as described in FIGS. 2-4. Consistent with such embodiments, the packet processor may include a congestion control module, such as congestion control module 250. In some examples, the congestion control module may perform a method for dynamically switching among a plurality of congestion control algorithms, such as method 400.
3. a secure REST interface includes a HTTP engine and an SSL engine. In some examples, in this sub-system, a REST interface encoder and decoder is implemented based on a HTTP engine. In some examples, the REST interface supports SSL encoding and decoding for secure data exchange.
4. a data serdes engine supports various serdes protocols (e.g., JSON, ProtoBuf, Thrift, etc.). The data serdes engine allows for instantiating various serdes protocols with an ability to do protocol translation at line-rate. For example, the incoming data requests can be in JSON, whereas the NoSQL data server returns data in BSON or Thrift. The data serdes engine will perform data format translation and return back valid JSON data to the application logic.
5. a index converter provides support for line rate translation of secondary indices included as part of data request to primary indices. This allows the data request to be completed using the more efficient primary indices.
6. a Proxy finite state machine (FSM) that comprises a FSM to manage various data and control transactions. The Proxy FSM keeps track of the state information of NoSQL Proxy 700 on a per-transaction basis and/or on a per-connection basis. It also interfaces with the configuration and coordination engine as well as the load balancer to determine appropriate actions (e.g., forwarding requests to another peer NoSQL Proxy).
7. a configuration and coordination engine that manages consensus and coordination among the sub-systems and/or other peer NoSQL Proxies operating in cooperation with NoSQL Proxy 700. Usually there is a trade-off between accepting data loss or delay or inconsistency and devoting more CPU cycles and network bandwidth to this function. One of the blocks in the configuration and coordination engine that can be accelerated and made highly efficient is the atomic broadcast (at the leader side) and the register and response block (at the follower side). In some examples, these improvements are implemented in the configuration and coordination engine so that scaling to more NoSQL Proxies becomes efficient. In some examples, the configuration and coordination engine operates using the Apache ZooKeeper project. In some examples, Zookeeper is used for consensus and coordination of status and functional upkeep information (e.g., service is at w.x.y.z IP address, supports xxx Mb/s traffic, service is up, etc.). In some examples, Zookeeper is not for general data sharing between NoSQL Proxies, which occurs over the network interface.
8. a load balancer to interface with other peer NoSQL Proxy instances to better manage the application side traffic. In some examples, the load balancer maintains a set of counters and logic to measure a targeted metric (e.g., transactions per second, Mb/s or Gb/s, and/or the like) and decides whether a particular peer NoSQL Proxy is running at a load higher than a present number (e.g., 85%, 90%, and/or the like). In some examples, when it appears based on the targeted metric that a NoSQL Proxy is likely not going to be able to meet the set SLA, an incoming request for a transaction is forwarded to another peer NoSQL Proxy that has more capacity to handle the request. In some examples, bloom filters and/or the like are used to determine as a pre-processing step to load balancing whether the data for the incoming request being analyzed is cached in the current NoSQL Proxy. When the data is not cached locally, the request becomes subject to load balancing and may be forwarded to a peer NoSQL Proxy that has capacity to do further calculations and handle the request.
9. a hybrid memory management unit (H-MMU) that allows a flexible caching strategy where data may be stored using a combination of DRAM and SSD. In some examples, this allows access to cached data at DRAM latencies while allowing the H-MMU to determine appropriate reading and/or writing schedules to the SSD. In some examples, the H-MMU may also enable isolation of either DRAM or SRAM from SSD, so that data may be cached directly in SSD without also being cached in SRAM or DRAM. In some examples, this isolation supports the writing of temporary data to SRAM and not allowing other permanent data from polluting the SRAM that is crucial to achieving performance. In some examples, the bloom filter tables/vectors may be stored in the SRAM and perform fast checks on whether the said proxy has the specific data or not. Architecture and operation of embodiments of the H-MMU is further described in U.S. Pat. No. 9,286,221, which is hereby incorporated by reference in its entirety.
10. a compute block that supports regular expression (regex) evaluation, filtering, and/or the like. In some examples, the compute block supports libraries capable of extending a language framework such as node.js. In some examples, the compute block supports tight coupling with one or more processors on the FPGA and/or accessible to NoSQL Proxy 700 via the PCIe interface, and/or other interfaces. In some examples, an interface, such as QuickPath Interconnect (QPI) from Intel Corporation, accelerator coherence port (ACP) from ARM Ltd., and/or the like, allows data moves between NoSQL Proxy 700 and the one or more processors using L2/L3 cache and not via the PCIe bus. In some examples, a compilation of a domain-specific language, such as Ragel and/or the like, may be used to support descriptions of complex data filtering and classing using regular expressions, that will generate C code for operation on the one or more processors or that can alternative be compiled into an FPGA using a high-level synthesis compiler.

According to some embodiments, NoSQL Proxy 700 may receive a data command from application logic via the PCIe interface when NoSQL Proxy 700 is located in the application server or via the 10 GbE MAC network interface from either an application server (e.g., when NoSQL Proxy 700 is located in either the application server or the NoSQL data store) or from a peer NoSQL Proxy when NoSQL Proxy 700 has cached data for a command received by the peer NoSQL Proxy. In some examples, the command is then forwarded to the index converter so that data references in the command that each reference to a secondary index is converted to a corresponding primary index to make the ensuing data access requests more efficient. In some examples, the index conversion occurs as line rate so as not to introduce unwanted delays in the processing of the command. In some examples, the command is then passed to the data serdes engine to convert data in the command to the data format protocol of the NoSQL data store. In some examples, the protocol conversion occurs as line rate so as not to introduce unwanted delays in the processing of the command. The command is then processed. In some examples, the results of the command are then passed through a compute block for additional processing to support additional expression evaluation and/or filtering. In some examples, results of the command are then passed back through a data serdes engine to convert the results to the data format protocol of the application logic issuing the command. In some examples, the protocol conversion occurs as line rate so as not to introduce unwanted delays in the processing of the command. The results of the command are then passed back to the application logic.

As described above, the various embodiments of NoSQL Proxy 700 and data center architectures using NoSQL Proxy 700 are advantageously able to achieve high throughput network connections, access large amounts of data using tiered memory, and/or accelerate serialization and deserialization operations.

Some examples of the proxies and servers described herein may include non-transient, tangible, machine readable media that include executable code that when run by one or more processors may cause the one or more processors to perform the processes and methods described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a field-programmable gate array (FPGA) with a configurable logic module, wherein the configurable logic module is configured to implement a protocol endpoint, the protocol endpoint including a congestion control module;
wherein the protocol endpoint is configured to receive protocol data;
wherein the congestion control module is configured to:
analyze the protocol data; and
dynamically select a congestion control algorithm from a plurality of congestion control algorithms to apply to network traffic based on the analyzed protocol data, wherein each of the plurality of congestion control algorithms is capable of detecting and mitigating congestion in the network traffic.

2. The system of claim 1, wherein the protocol endpoint corresponds to a transmission control protocol (TCP) endpoint.

3. The system of claim 1, wherein state information associated with a networking protocol implemented by the protocol endpoint is stored in and retrieved from block memory of the configurable logic module.

4. The system of claim 3, wherein no state information associated with the networking protocol is stored in and retrieved from a memory other than the block memory.

5. The system of claim 1, wherein the congestion control module is configured to perform operations comprising:
monitoring a congestion condition of a network; and
dynamically switching among the plurality of congestion control algorithms based on the monitored congestion condition.

6. The system of claim 1, wherein the congestion control module is configured to:
initialize one or more variables;
detect a network activity event; and
when the network activity event is reception of an acknowledgement (ACK):
update one or more congestion metrics;
dynamically select the congestion control algorithm based on the updated one or more congestion metrics; and
apply the selected congestion metric.

7. The system of claim 6, wherein to select the congestion control algorithm, the congestion control module is configured to apply one or more rules based on the updated one or more congestion metrics.

8. The system of claim 6, wherein when the network activity event is a timeout, the congestion control module is configured to perform operations comprising applying timeout congestion control.

9. The system of claim 8, wherein the timeout is associated with a retransmission time out or reception of three duplicate ACKs.

10. The system of claim 6, wherein the selected congestion control algorithm is selected from a group consisting of TCP Tahoe, TCP Reno, TCP Vegas, TCP New Reno, TCP Hybla, TCP BIC, TCP CUBIC, Agile-SD TCP, TCP Westwood, TCP Westwood+, Compound TCP, TCP Proportional Rate Reduction, and TCP BBR.

11. A method of congestion control implemented on a field-programmable gate array (FPGA), the method comprising:
receiving protocol data at a protocol endpoint configured in the FPGA;
analyzing the protocol data;
dynamically selecting a congestion control algorithm from a plurality of congestion control algorithms to apply to network traffic based on the analyzed protocol data, wherein each of the plurality of congestion control algorithms is capable of detecting and mitigating congestion in the network traffic; and applying the congestion control algorithm using a congestion control module configured in the FPGA.

12. The method of claim 11, wherein the protocol endpoint corresponds to a transmission control protocol (TCP) endpoint.

13. The method of claim 11, further comprising:
storing state information associated with a networking protocol implemented by the protocol endpoint in block memory of the FPGA; and
retrieving state information associated with the networking protocol implemented by the protocol endpoint in the block memory of the FPGA.

14. The method of claim 13, wherein no state information associated with the networking protocol is stored in and retrieved from a memory other than the block memory.

15. The method of claim 11, further comprising:
monitoring a congestion condition of a network; and
selecting the congestion control algorithm further based on the monitoring.

16. The method of claim 11, further comprising:
initializing one or more variables;
detecting a network activity event; and
when the network activity event is reception of an acknowledgement (ACK):
updating one or more congestion metrics; and
dynamically selecting the congestion control algorithm based on the updated one or more congestion metrics.

17. The method of claim 16, wherein selecting the congestion control algorithm comprises applying one or more rules based on the updated one or more congestion metrics.

18. The method of claim 16, wherein when the network activity event is a timeout, the method further comprises applying timeout congestion control.

19. The method of claim 18, wherein the timeout is associated with a retransmission time out or reception of three duplicate ACKs.

20. The method of claim 11, wherein the selected congestion control algorithm is selected from a group consisting of TCP Tahoe, TCP Reno, TCP Vegas, TCP New Reno, TCP Hybla, TCP BIC, TCP CUBIC, Agile-SD TCP, TCP Westwood, TCP Westwood+, Compound TCP, TCP Proportional Rate Reduction, and TCP BBR.

* * * * *